Oct. 3, 1967  F. A. LANE  3,344,674
WHEEL BALANCER

Filed April 13, 1965  2 Sheets-Sheet 1

INVENTOR
FLOYD A. LANE
BY
*George C. Thompson*
AGENT

Oct. 3, 1967  F. A. LANE  3,344,674
WHEEL BALANCER
Filed April 13, 1965  2 Sheets-Sheet 2

INVENTOR
FLOYD A. LANE
BY
George C. Thompson
AGENT

# United States Patent Office 3,344,674
Patented Oct. 3, 1967

3,344,674
WHEEL BALANCER
Floyd A. Lane, Palos Verdes Peninsula, Calif., assignor to TRW Inc. a corporation of Ohio
Filed Apr. 13, 1965, Ser. No. 447,752
4 Claims. (Cl. 73—480)

ABSTRACT OF THE DISCLOSURE

To provide an accurate static wheel balancing mechanism, a balance arm is pivoted about a frame with a spindle pivoted at an angle to the arm to support a wheel. The uppermost peripheral portion of the wheel extends substantially directly over the pivot point so that a maximum force is generated at 180° from the minimum force generated when a heavy portion of the wheel is displaced 180°. An optical system is provided to indicate displacement of the balance arm.

---

This invention relates to a wheel balancer and more particularly to a storable static wheel balancer for vehicle wheels. It has long been a problem to provide a sensitive wheel balancing device that is sufficiently lightweight and compact to be transportable quickly and easily, while at the same time providing an accurate static wheel balancing mechanism.

It is, therefore an object of this invention to provide a static wheel balancing device that is highly sensitive in its unbalancing detecting capabilities.

It is another object of this invention to provide a sensitive static wheel balancing device capable of storage by rapid folding.

It is another object of this invention to provide a wheel balancing device of increased sensitivity to static unbalance.

It is another object of this invention to provide a wheel balancing device that is simple in structure and capable of rough handling.

Other objects, purposes and characteristic features will become obvious as the description of the invention progresses.

The invention is illustrated in the accompanying drawings, in which.

In the views of the drawings, similar parts bear like reference characters.

Figure 4:
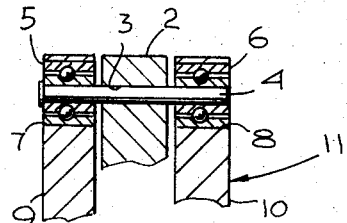
FIG. 4 is an enlarged sectioned view taken along the line 4—4 of FIG. 1.

The static wheel balancing device of this invention comprises a balancing arm 1 provided with a pivot support arm 2 secured to and projecting upwardly therefrom provided with an opening 3 at its outer extremity for receiving a pivot pin 4 of sufficient length to extend outwardly through a pair of frictionless bearings 5 and 6 (see FIG. 4) located within suitable openings 7 and 8, respectively, of the arms 9 and 10, respectively, of a U-shaped frame member 11. The arms 9 and 10 of the frame member 11 are positioned in spaced-apart relationship and are of such length as to provide an opening therebetween for receiving the balance arm 1 and its secured support arm 2 for movement therebetween. The frame member 11 has secured thereto, as by welding, a leg 12 and a bracket member 13. The leg 12 is of sufficient length to place the balance arm 1 at a convenient height above its supporting surface. The bracket 13 is also secured to the frame member 11, as by welding, and is provided with outwardly extending arms 14 and 15 displaced 120 degrees apart and formed with U-shaped outer extremities for receiving therein a pair of legs 16 and 17, respectively. The legs 16 and 17 are received within the U-shaped outer extremities of the bracket 13 and pivotally anchored to the U-shaped portions of the bracket 13 as by pivot bolts 18 and 19, respectively. When in operational supporting position the legs 16 and 17 are held by friction of the U-shaped outer extremities of the bracket 13 in an outwardly extending position so that the legs 12, 16 and 17 are each 120 degrees apart in separation forming a tripod.

When the device is stored, the legs 16 and 17 are pivoted about their pivot bolts 18 and 19 so that the outer ends of the legs are adjacent to the leg 12, which is previously described as secured to the frame member 11, as by welding.

Figure 3:
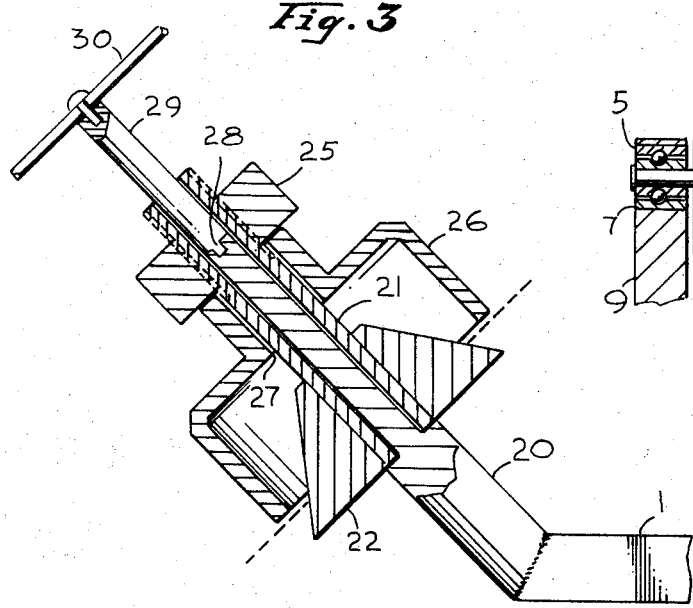
FIG. 3 is an enlarged sectioned view of the wheel supporting structure of the balancing device.

When the device is in its operating position, the balance arm 1 extends horizontally between the frame member 11 arms 9 and 10 and pivots freely on the pivot pin 4 for movement in a vertical plane. On the end of the balance arm nearest to the folding legs 16 and 17, there is provided an up-turned shaft 20 angled approximately 135 degrees upwardly away from the balance arm 1. The shaft 20 is provided with a shoulder for receiving a hollow core spindle 21 (see FIG. 3) having secured on its lower end a wheel supporting cone 22 with its largest diameter adjacent the lower end of the spindle. The spindle 21 is of sufficient length to extend beyond the end of the shaft 20 a sufficient amount for an indexing arm support as described hereinafter. The spindle 21 and attached cone 22 are free to rotate about the shaft 20. The cone 22 is also of sufficient diameter to accept, without passage therethrough, the central opening of any wheel that may be placed upon the balance for balancing purposes. The spindle 21 is provided with a threaded portion 24 along its outer extremity for receiving a securing nut 25, which is torqued down against a wheel securing cup 26 provided with a central opening 27 for receiving the spindle 21. The cup 26 engages the web of the wheel along its outer extremity, which is of sufficient span to exceed the opening in the center of the web of the wheel.

In addition, the shaft 20 is provided with an indexing slot 28 in the outer end thereof for keying the indexing support shaft 29 into the end of the shaft 20. The rotation position support shaft 29 is supported by the portion of the spindle 21 extending beyond the shaft 20 and has secured thereto a wheel rotation position arm 30 of sufficient span to extend substantially all the way across the diameter of any wheel that is ot be balanced.

Figure 2:
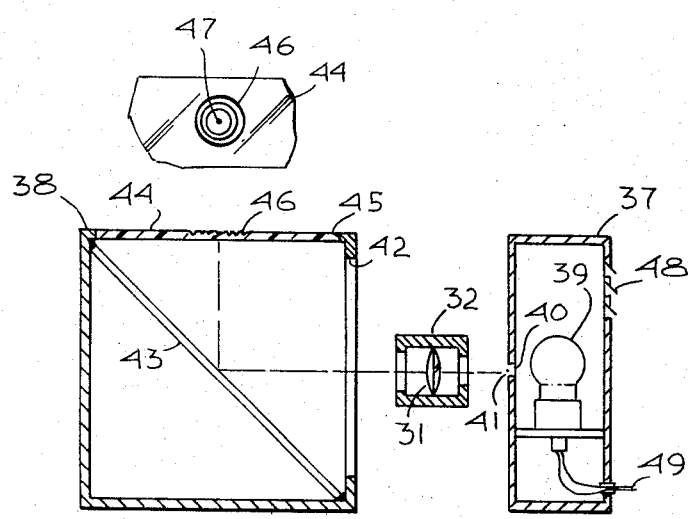
FIG. 2 is a sectional view taken along the line 2—2 of FIG. 1 showing the detection mechanism for the wheel balancer.

At the end of the balancing arm opposite the spindle 21 there is provided an indexing lens 31 secured to the outer extremity of the balance arm 1 by suitable surrounding support 32 provided with a horizontal opening therethrough. The support 32 positions the lens 31 in a plane which allows the lens to pass light through it in a horizontal plane. For determining the movement of the balance arm 1, the leg 12 has secured thereon a support bracket 33 which has pivotally secured thereto, by a pivot bolt 35, an indexing support arm 34. The indexing support arm 34 extends upwardly and is offset toward the lens end of the balance arm 1 a sufficient amount to terminate at a position adjacent to and below the lens support on the end of the balance arm 1. The indexing support arm 34 has secured to its upper end an optical indexing device 36 comprising an indexing device base member with two upstanding housings 37 and 38 placed in spaced-apart relationship on opposite sides of the lens 31. The upstanding housing 37 of the indexing device 36 is provided with a suitable light bulb 39 therein positioned to project light therefrom through an opening 40 in the housing 37 adjacent the lens 31. The opening 40 has a hairline 41 across the middle thereof for providing an indexing image on the readout of the indexing device (see FIG. 2).

The housing 38 is provided with an opening 42 in the side thereof adjacent to the lens 31. The opening 42 is of sufficient size to accept light from the lens 31 within a reasonable span of displacement of the balance arm 1 as results from an unbalanced wheel. In addition, the housing 38 is provided with a reflector 43 positioned at approximately a 45-degree angle to receive any light admitted by the opening 42 and reflect the light upwardly on to a translucent screen 44 secured within an opening 45 in the top surface of the housing 38. The translucent screen 44 is also provided with an indexing series of rings 46 cut into the surface thereof to provide an easy means of identifying any displacement of the light beam occurring as a result of displacement of the balance arm 1. In the center of the rings 46 is provided a center dot 47 cut into the translucent screen 44 which, of course, would fall directly upon the projected image of the hairline 41 when the balance arm is exactly on neutral balanced position.

The housings 37 and 38 are substantially totally enclosed except for the aforementioned opening for indexing purposes and for suitable louvers 48 on the housing 37 for dissipating heat generated by the bulb 39. The purpose of the substantial enclosing of the housings 37 and 38 is to provide for a minimum of outside light interference with the indexing light created by the lamp 39.

The lamp 39 can be energized by any suitable source through the conductor 49, with the source being either A.C. commercial power or D.C. battery source depending upon the availability of power and the voltage of the bulb used.

Secured to the indexing device 36 is a damping member comprising a flexible spring member 51 which is secured at one end to the indexing device base member 36 with its other end extending upwardly and to the rear of the end of the balance arm 1 and lens support 32. The flexible spring member 51 is provided with a suitable cushion 52, such as a foam rubber cushion, bonded to its free end in a position to engage the support 32 when it is depressed by the operator toward the support 32 for snubbing purposes. This member is used only to dampen out oscillations of the balance arm 1 during balancing operations.

The balance arm 1 is provided with a movable weight 53 supported for sliding movement along the balance arm 1 by suitable rings 54 and 55. The weight 53 is displaced along the arm a sufficient distance to counteract the weight of the rim and the wheel (shown in phantom) which is placed upon the spindle 21. For fine adjustment of the displacement of the weight 53 along the balance arm 1, the ring 55 is provided with an upstanding clevis 56 for receiving the end of a suitable turnbuckle 57, or similar device, therein with the end of the turnbuckle pivotally secured to the clevis by suitable bolt 58. The balance arm 1 is also provided with a clamp 59 securely fastened about the balance arm 1. The clamp 59 is also provided with a clevis 60 secured in a position to extend upwardly and receive the opposite end of the turnbuckle 57 which is, in turn, secured to the clevis by suitable bolt 61. It should be clear, therefore, that rotation of the turnbuckle 57 or similar device would force the ring 55 to slide toward or away from the clamp 59 depending upon the direction of rotation of the turnbuckle 57. With the ring 55 secured to the weight 53, it would also be displaced a like amount. The weight 53 is made to correspond to the smallest vehicle wheel to be balanced and is then provided with support pins 62 and 63 having enlarged heads and which are secured to the lower surface of the weight 53 in a position to engage suitable keyhole openings 64 and 65, respectively, in an additional weight 66 so that the additional weight may be added to the original weight 53 for accepting heavier wheels on the spindle 21.

Operation of the device will now be described. The spindle 21 is removed from the shaft 20 and inserted into the central opening of the wheel to be balanced with the cone 22 engaging the web opening in the wheel. The cup 26 is then slipped over the spindle 21 with its outer periphery in a position to engage the web of the wheel and force it down against the surface of the cone in order to center the wheel on the spindle 21. At this point, the securing nut is torqued down against the cup 26 securely anchoring the spindle within the wheel opening. The spindle is then slipped over the shaft 20 down against its shoulder. At this point, the indexing support shaft 29 is slipped into the hollow core of the spindle 21 for support and rotated until the end of the shaft 29 engages the indexing slot 28 for positioning the arm 30 so that the upper end of the arm 30 is positioned above the pivot point 4 of the balance arm 1. This means that the arm 30 is not in a plane with the balance arm 1 but is displaced a sufficient angle to indicate the point on the wheel which falls in a vertical plane directly through the pivot 4 of the balance arm 1. At this point, the weight 53 is adjusted to provide a rough balance of the balance arm 1. The wheel to be balanced is then rotated until the heaviest point is at the lowest point (farthermost from the pivot 4) of the wheel as it is positioned on the spindle 21. Since the heaviest point is now farthest away from the pivot 4, the balance arm 1 will displace the lens 31 to its uppermost deflection. The weight 53 is then adjusted until the hairline 41 causes a shadow to fall upon the dot 47 in the translucent screen with the bulb 39 energized. It is pointed out that with the heavy point at the lowest point on the wheel, the balance arm 1 is most sensitive because of the exaggerated lever arm occurring by the displacement of the heaviest point farthest away from the pivot 4 of the balance arm 1. The heaviest spot now occurring at the lowest point on the wheel, the wheel is then marked at this point in some suitable manner, such as by a chalk mark, and the wheel is then rotated clockwise until the chalk mark falls under the lower end of the arm 30. This displaces the hairline shadow away from the dot 47. The weight 53 is again adjusted by the turnbuckle 57 until the hairline 41 again casts a shadow on the dot 47 in the translucent screen 44. At this point, the wheel is rotated 180 degrees until the chalk mark is directly under the upper reference end of the indexing arm 30. Due to the fact that the wheel is heavier at the chalk mark point and the lever arm has been substantially shortened, the balance arm 1 will be displaced at its lens end downwardly and the indexing hairline 41 will cast a shadow displaced from the dot 47 on the translucent screen 44. It is now necessary to add weights adjacent to the lower end of the arm 30 until the hairline 41 again casts its shadow upon the center position or dot 47 as the arm 1 is returned to the neutral balanced position. The total weight to be added to the wheel at the lower end of the indexing arm 30 is divided, with half the weight being placed on the inside of the rim and the other half being placed on the outside of the rim at a position opposite the lower end of the arm 30. The wheel is then rotated to different positions to check for the accuracy of the balance made. If the balance is properly made, the hairline 41 shadow will remain across the dot 47 on the translucent screen 44.

It is pointed out that the sensitivity of this balancing device is greatly enhanced by the long lever arm utilized through the angled position of the wheel on the balance arm 1. The unbalance to be measured is provided with the greatest possible convenient lever arm to make the greatest possible deflection occur. This leverage is the projected horizontal distance from the pivot to the farthermost point on the wheel with the wheel slanted to about 135 degrees. It is also pointed out that by balancing the wheel along the indexing arm 30 after the heaviest unbalance has been detected by the greatest lever arm, the equal masses of the metal and tire positioned on opposite sides of the spindle 21 and along the arm 30 will exactly balance out, leaving only the unbalanced mass to be detected by the deflection of the arm 1. This occurs since the arm 30 is indexed to allow the operator to know approximately where the pivot point of the arm 1 occurs along the periphery of the wheel being balanced.

Figure 1:
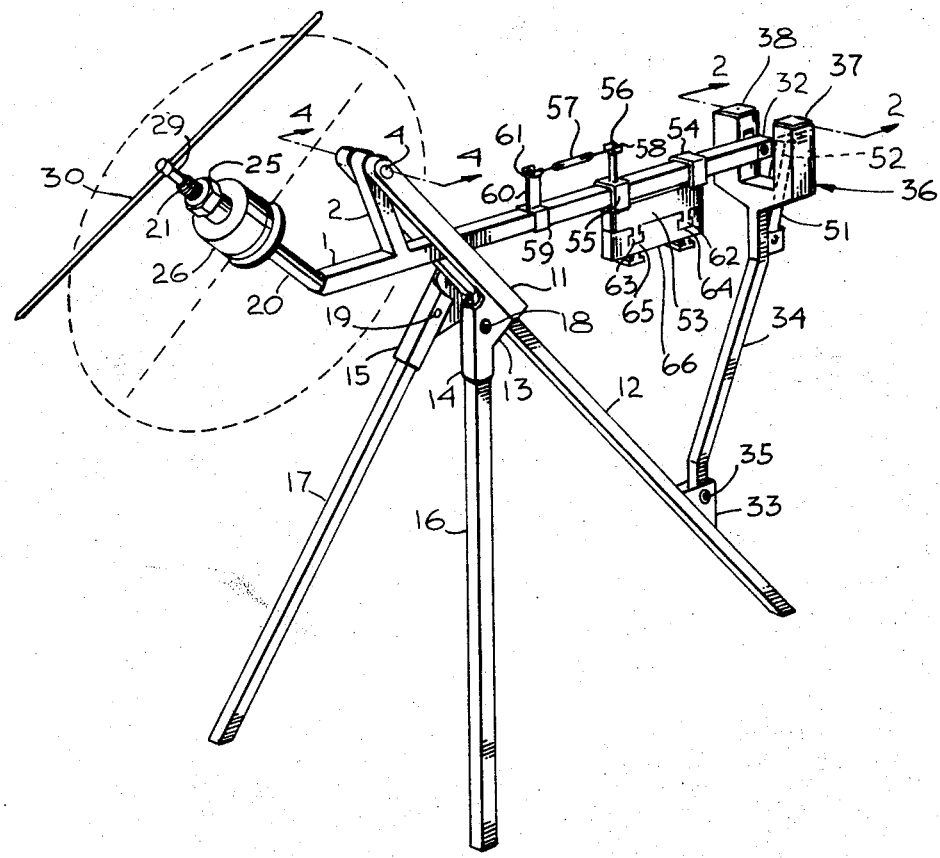
FIG. 1 is an elevational view of the static wheel balancing device embodying this invention.
Figure 5:
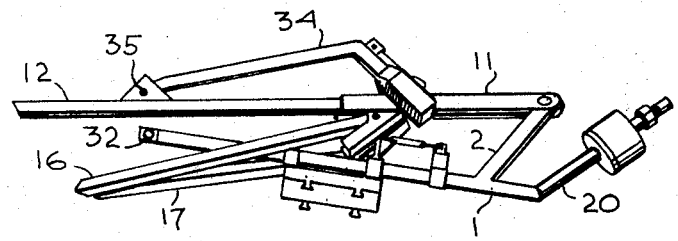
FIG. 5 is a view of the wheel balancer in its folded configuration.

After the wheel has been balanced and removed from the spindle 21, the spindle 21 can be removed from the shaft 20 and the lens end of the balance arm 1 rotated up and over the frame member 11, with the lens end of the balance arm 1 sweeping approximately 300 degrees and engaging the leg 12 adjacent to its outer extremity (see FIG. 5). At this point, the indexing arm 34 can be pivoted about its support bolt 35 allowing its outer extremity including the indexing device 36 to engage the frame member 11. The legs 16 and 17 are then pivoted inwardly toward the leg 12 and about their pivots 18 and 19, respectively. It can be seen, therefore, that the device is now collapsed into a relatively tight package which can be easily handled and stored as shown in FIG. 5.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. A static wheel balancer comprising:
   a balance arm having wheel support and indexing ends;
   a frame means for supporting said balance arm in a substantially horizontal position;
   a substantially frictionless pivot means between said balance arm and said frame means for providing relative movement between said balance arm and said frame means;
   a spindle means on the wheel support end of said balance arm and extending upwardly from said balance arm at an angle of substantially 135 degrees means for supporting a wheel on said spindle means;
   an optical indexing means supported on said frame means adjacent the indexing end of said balance arm for detecting any movement of said balance arm;
   an indexing arm supported by said spindle means and adjacent a wheel to be balanced for position reference of the wheel; and
   an adjustable weight means positioned for movement along said balance arm at a location between said pivot means and the indexing end of said balance arm for balance adjustment to the mass of any wheel mounted on said spindle;
   said spindle means being at such an angle as to place a portion of the periphery of a wheel to be balanced above said pivot means for said balance arm to provide for accurate isolation of the unbalanced weight as distinguished from the symmetrical wheel mass located on opposite sides of the spindle means while at the same time providing a large leverage for detecting a heaviest point on the wheel with the leverage equal to substantially the projected horizontal distance of the diameter of the wheel on the 135 degree slant measured from the pivot means to the farthermost point on the wheel.

2. A static wheel balanced comprising:
   a balance arm having wheel support and indexing ends;
   a frame means for supporting said balance arm in a substantially horizontal position;
   a substantially frictionless pivot means between said balance arm and said frame means for providing relative movement between said balance arm and said frame means;
   a spindle means having means for supporting a wheel on the wheel support end of said balance arm and extending upwardly from said balance arm at an angle of substantially 135 degrees, said wheel support means being adapted to support said wheel so that the uppermost peripheral portion of said wheel lies substantially directly over said pivot point;
   an optical indexing means supported on said frame means adjacent the indexing end of said balance arm for detecting any movement of said balance arm;
   an indexing arm supported by said spindle means and adjacent a wheel to be balanced for position reference of the wheel; and
   an adjustable weight means positioned for movement along said balance arm at a location between said pivot means and the indexing end of said balance arm for balance adjustment to the mass of any wheel mounted on said spindle;
   said optical indexing means including a light source and visual display located on opposite sides of the indexing end of said balance arm; and
   a lens means supported on said balance arm for movement therewith and in a position to receive light from said light source and focus the light upon said visual display.

3. A static wheel balancer comprising:
   a balance arm having wheel support and indexing ends;
   a frame means for supporting said balance arm in a substantially horizontal position;
   a substantially frictionless pivot means between said balance arm and said frame means for providing relative movement between said balance arm and said frame means;
   a spindle means having means to support a wheel on the wheel support end of said balance arm and extending upwardly from said balance arm at an angle of substantially 135 degrees, said wheel support means being adapted to support said wheel so that the uppermost peripheral portion of said wheel lies substantially directly over said pivot point;
   an optical indexing means supported on said frame means adjacent the indexing end of said balance arm for detecting any movement of said balance arm;
   an indexing arm supported by said spindle means and adjacent a wheel to be balanced for position reference of the wheel; and
   an adjustable weight means positioned for movement along said balance arm at a location between said pivot means and the indexing end of said balance arm for balance adjustment to the mass of any wheel mounted on said spindle;
   said indexing arm having sufficient length to provide a reference end positioned above said pivot means, said reference end extending to a position approximately along the periphery of a wheel in position to be balanced.

4. A static wheel balancer comprising:
   a balance arm having wheel support and indexing ends;
   a frame means for supporting said balance arm in a substantially horizontal position;
   a substantially frictionless pivot means between said balance arm and said frame means for providing relative movement between said balance arm and said frame means;
   a spindle means having means to support a wheel on the wheel support end of said balance arm and extending upwardly from said balance arm at an angle of substantially 135 degrees, said wheel support means being adapted to support said wheel so that the uppermost peripheral portion of said wheel lies substantially directly over said pivot point;

an optical indexing means supported on said frame means adjacent the indexing end of said balance arm for detecting any movement of said balance arm;

an indexing arm supported by said spindle means and adjacent a wheel to be balanced for position reference of the wheel; and an adjustable weight means positioned for movement along said balance arm at a location between said pivot means and the indexing end of said balance arm for balance adjustment to the mass of any wheel mounted on said spindle;

said frame means including a plurality of legs positioned substantially 120 degrees apart with all but one of said legs being pivotally secured to said frame member for rotation substantially adjacent to said one unpivoted leg;

said spindle means being rotatable about said pivot means to a position substantially adjacent to said frame and said unpivoted leg; and said optical indexing means being pivotally supported on said unpivoted leg for rotation to a position substantially adjacent said unpivoted leg.

References Cited

UNITED STATES PATENTS

| | | | |
|---|---|---|---|
| 995,109 | 6/1911 | Bassett | 73—482 |
| 3,177,725 | 4/1965 | Johnson | 73—480 |

FOREIGN PATENTS 570,499  7/1945  Great Britain.

JAMES J. GILL, *Primary Examiner.*

RICHARD QUEISSER, *Examiner.*